May 2, 1944.　　　　　S. C. HOARE　　　　　2,348,005
ELECTRICAL MEASURING INSTRUMENT
Filed Dec. 11, 1942　　　　　3 Sheets-Sheet 1
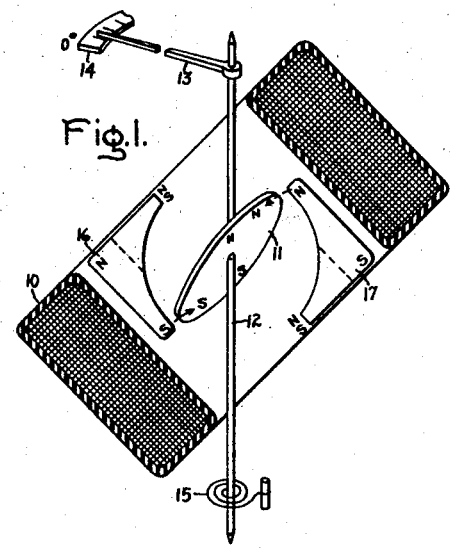
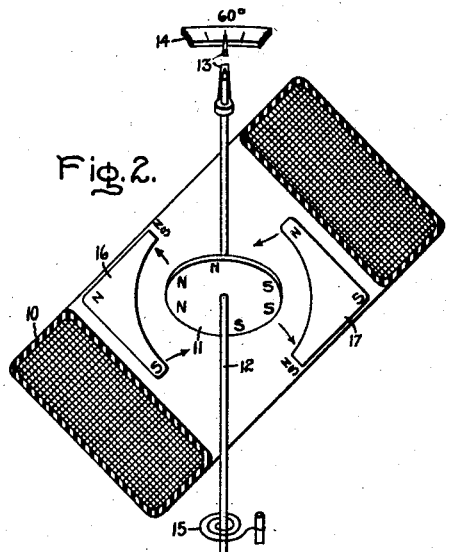
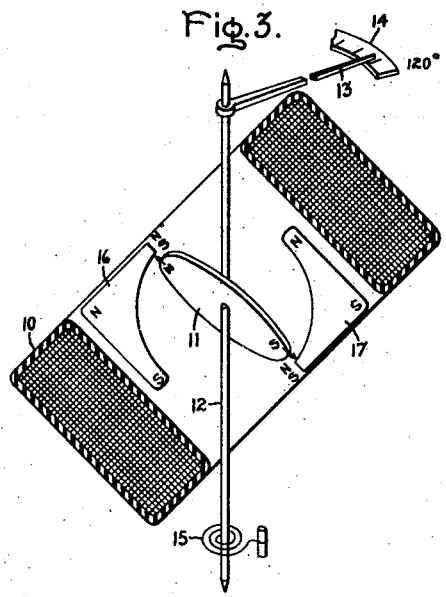
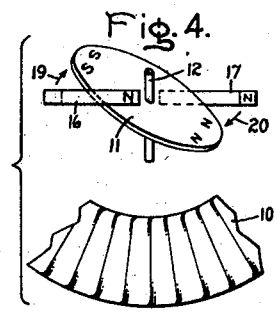
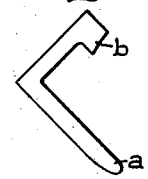
Inventor:
Stephen C. Hoare,
by Harry E. Dunham
His Attorney.

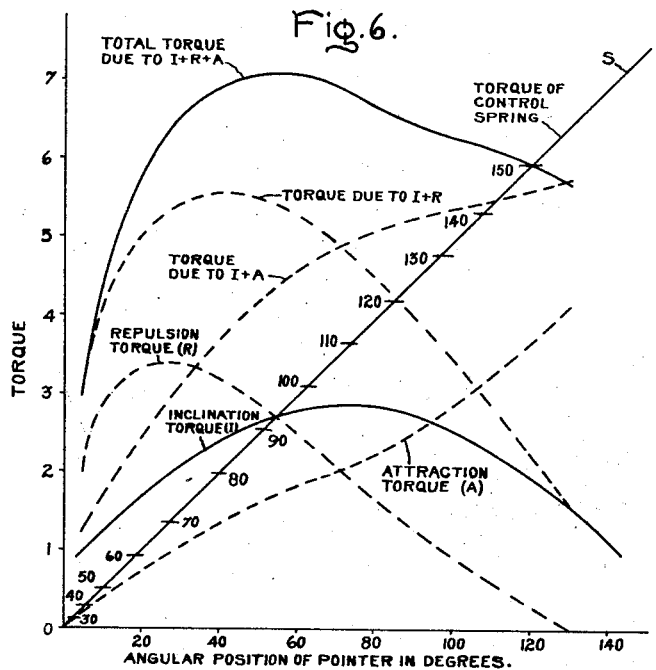
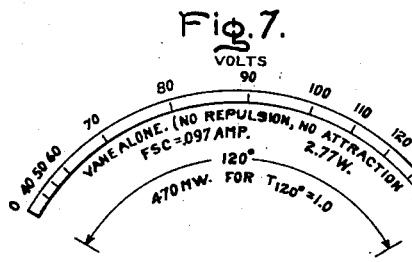
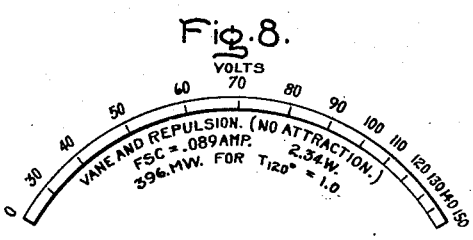
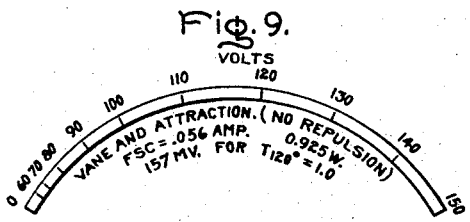
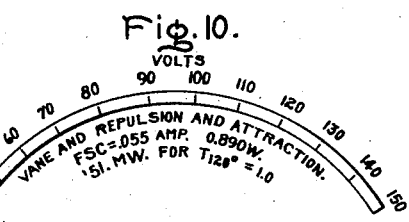

May 2, 1944. S. C. HOARE 2,348,005
ELECTRICAL MEASURING INSTRUMENT
Filed Dec. 11, 1942   3 Sheets-Sheet 3
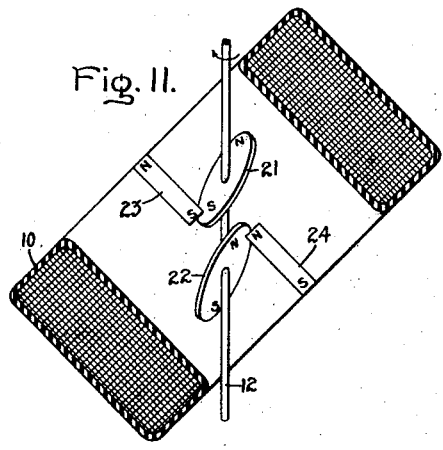
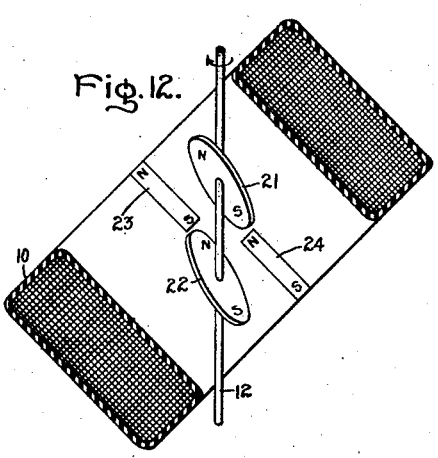
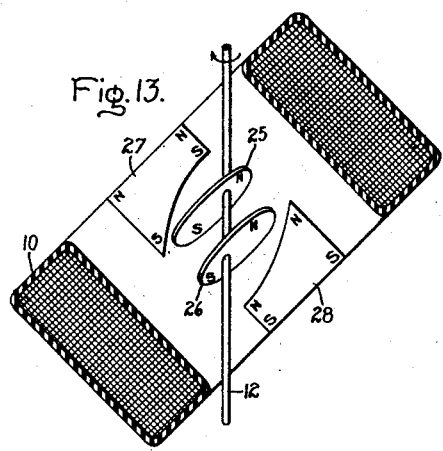
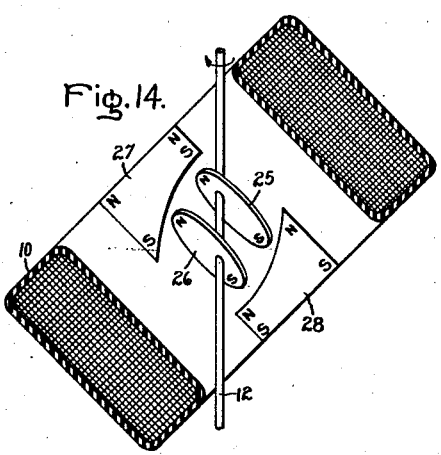
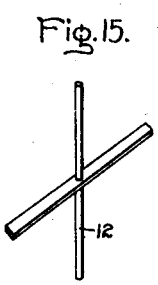
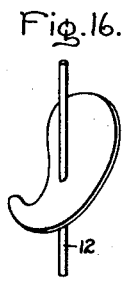
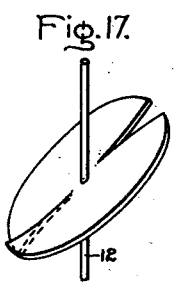
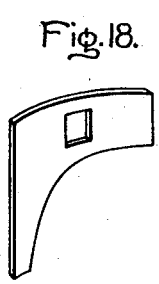
Inventor:
Stephen C. Hoare,
by Harry E. Dunham
His Attorney.

Patented May 2, 1944

2,348,005

UNITED STATES PATENT OFFICE 2,348,005

ELECTRICAL MEASURING INSTRUMENT

Stephen C. Hoare, Manchester, Mass., assignor to General Electric Company, a corporation of New York Application December 11, 1942, Serial No. 468,672

6 Claims. (Cl. 171—95)

My invention relates to electrical measuring instruments and in particular to inclined coil magnetic vane instruments the torque of which has been supplemented with additional torques due to repulsion and attraction.

In the inclined coil magnetic vane instrument the torque is produced by the turning of the vane or vanes from a position generally crosswise of the stationary energizing coil to a position generally axially of such coil. In carrying my invention into effect in its preferred form I add to the inclined coil instrument stationary irons which are polarized by the coil flux and which are so placed within the coil and adjacent the path of movement of the vane or vanes as to produce repulsion torque thereon over the lower portion of the deflection range and a torque of attraction thereon over the upper portion of the deflection range, both of such torques being in the same direction as the inclined coil torque thereby greatly increasing the sensitivity of the instrument and improving its scale distribution and extending the deflection angle.

The invention may be incorporated in the instrument in a variety of different forms a few of which will be described in connection with the accompanying drawings, while those features which are believed to be novel and patentable will be pointed out in the claims appended hereto.

Figs. 1, 2 and 3 represent partial views of a single vane instrument provided with repulsion and attraction torque irons, Fig. 1 representing a downscale position of the vane, Fig. 2 a midscale position of the vane, and Fig. 3 an upscale position of the vane. Fig. 4 represents a partial view taken axially of the coil of Fig. 1 to assist in indicating the disposition of fixed irons. Fig. 5 represents a modified form of fixed iron that may be used in the instrument of Figs. 1 to 3.

Fig. 6 represents, by way of deflection, torque curves, the nature of the torques produced by the different elements of an instrument such as is shown in Fig. 1. Figs. 7, 8, 9 and 10 show by way of comparison typical scale distributions for an inclined coil instrument with inclined coil torque only, inclined coil and repulsion torque only, inclined coil and attraction torque only and inclined coil torque and both repulsion and attraction torques respectively. Figs. 11 and 12 show downscale and upscale positions, respectively, of an inclined coil instrument having two vanes where there is repulsion torque on the vanes at the lower end of the scale and attraction on the vanes at the upper end of the scale and where the fixed irons operate on different vanes at the lower and upper ends of the scale. In this modification the vanes are not parallel. Figs. 13 and 14 show downscale and upscale positions of the vanes of a two-vane instrument having both repulsion and attraction torques where the fixed irons act separately on the vanes to produce repulsion torque over the downscale position and act collectively on both vanes to produce attraction torque in the upscale position. In this modification the vanes are eccentric with respect to the shaft. Figs. 15 to 17 inclusive, show modified forms of vanes and Fig. 18 a fixed iron made from a curved plate.

Referring now to Figs. 1, 2 and 3, 10 represents the energizing coil, 12 the shaft, 11 the magnetic vane, 13 the pointer, 14 the scale and 15 the control spring of the well-known type of inclined coil electric measuring instrument. The torque of such an instrument is provided by the vane 11 turning from a position generally crosswise of the coil (Fig. 1) to a position generally axially of the coil (Fig. 3) and tending to line up the axis of the vane with the flux axis of the coil. This torque is opposed by the control spring 15 and hence a deflection is produced proportional to the energizing current. The vane is inclined with respect to the shaft and the shaft is inclined with respect to the axis of the coil which disposition gives the inclined torque principle. In Figs. 1 to 3 the vane is assumed to be somewhat elliptical in shape and to be concentric with respect to the shaft. These are factors which affect the efficiency, scale distribution, etc. but not the principle involved and the invention is not limited in these respects.

To the inclined coil instrument described I have added fixed iron or pieces of magnetic material 16 and 17. These pieces are within the coil and hence are polarized by the flux of the coil in the direction of the flux axis. Thus, if the coil produces a north magnetic pole at its upper end, the upper end portions of the pieces 16 and 17 will be polarized north and the lower end portions south. Likewise, the magnetic vane 11 will have that portion nearest the upper end of the coil polarized north and that portion nearest the lower end of the coil polarized south.

Such polarization is represented in the drawings by the designations "N" and "S." If the coil be energized by alternating current, the polarities will all reverse with the current reversal but the relative polarity relationship will remain the same and the instrument may be used on either alternating current or direct current circuits.

The pieces 16 and 17 are so shaped and disposed adjacent to and relative to the path of movement of the magnetic vane 11 as to produce repulsion torque on the magnetic vane when in the downscale position indicated in Fig. 1 and attraction torque on the magnetic vane in the upscale position indicated in Fig. 3. Also, these repulsion and attraction torques are in the same direction of rotation of the vane as the torque due to inclination. Thus, in Fig. 1 the portion of vane and fixed iron parts which are adjacent each other are similarly polarized and hence produce repulsion torque, the direction of which is best visualized in Fig. 4 by the arrows 19 and 20. This is in the same upscale or clockwise direction in which the vane tends to turn to place itself in alignment with the flux axis of the coil.

In the midscale position (Fig. 2) there is both repulsion and attraction torques on the vane but these torques are less than maximum values because the magnetic polarity at the center curved edge of the fixed irons is weak and the closest adjacent part of the elliptical vane lies at a greater distance therefrom than in other positions. However, over the midscale range the inclined coil torque becomes a maximum. In the upscale position of the vane, Fig. 3, the repulsion torque is negligible and the attraction torque is a maximum due to the close approach of the poles of unlike polarity on the fixed and moving magnetic parts. The manner in which the different torques vary and their relative magnitude for different vane positions are shown in the curves of Fig. 6 where curve R represents the repulsion torque, curve A the attraction torque, curve I the inclined coil torque, curve $I+R$ the sum of the inclined coil and repulsion torques, curve $I+A$ the sum of the inclined coil and attraction torques and curve $I+A+R$ the sum of all of the torques. The straight line curve S represents the required return spring torque for a 120 degree scale instrument. That is, the spring torque is made equal to the total torque at 120 degrees.

In moving from downscale to upscale position, the flux axis through the vane shifts somewhat in a counter-clockwise direction. In Figs. 1 to 3 the arrows pointing towards the vane represent repulsion and those pointing away from the vane represent attraction. Fixed irons with the center curved portion cut away would produce essentially the same repulsion and attraction torque characteristics as is shown by the curves of Fig. 6. Thus Fig. 5 represents a fixed iron that could be substituted for the iron 16 of Figs. 1 to 3 with little change in torque characteristics. Omitting one of the fixed irons of Figs. 1 to 3 would reduce the repulsion and attraction torques to about half the values indicated in Fig. 6.

If only repulsion and inclined coil torques are desired, the irons 16 and 17 could be cut along the lines indicated dotted in Fig. 1 and the parts nearest the center of the coil removed. Likewise, if only attraction and inclined coil torques are desired, the portions of irons 16 and 17 nearest the coil would be removed. Cutting the fixed irons as suggested and leaving both parts thereof in place would produce a negligible change from the conditions represented in Fig. 6. Hence, it is apparent that the torque characteristics of the instrument over the deflection range may be varied at will by simple changes in the shape, disposition and dimensions of the fixed iron parts used. Fig. 7 shows the usual scale distribution of the simple inclined coil instrument. Fig. 8 shows the scale distribution when only the repulsion torque is added, Fig. 9 shows the scale distribution when only attraction torque is added and Fig. 10 shows the scale distribution when all three torques are present for an instrument such as is shown in Figs. 1 to 3.

It is evident from the different scale distributions represented that there is opportunity for a wide choice in this respect and that the addition of the repulsion torque expands the lower part of the scale and the addition of the attraction torque expands the upper part of the scale. By separating the extremities of the fixed irons as by further separating the points $a$ and $b$ of the iron shown in Fig. 5, the useful length of scale distribution may be increased and by decreasing such spacing, the useful scale length may be decreased.

However, the most important improvement obtained by the invention is the large increase in torque per watt input. The addition of the fixed irons within the coil decreases the reluctance, increases the flux and with the A.-C. instrument increases the reactance and decreases the current. This is incidental but helpful in increasing the torque which is due primarily to the repulsion and attraction torques which have been added. Under each scale Figs. 7 to 10 are given the full scale A.-C. current values designated FSC, the full scale A.-C. watt input designated "W" and the A.-C. milliwatt input per unit of torque at full scale designated "MW for T 120°≡1.0." These values are given for an instrument such as is represented in Figs. 1 to 3 with the same ampere turn input of 212 under the different conditions. Thus the simple inclined coil instrument without repulsion or attraction torques with 212 ampere turn input has a full 120 degree scale input of .097 ampere and 2.77 watts and requires 470 milliwatts for producing a unit of torque at full scale. When only fixed irons for producing repulsion torque are added (curve R, Fig. 6, and the scale of Fig. 8) the current and watt input at full scale are .089 and 2.34, respectively, and 396 milliwatts are required to produce a unit of torque at full scale. When only fixed irons for attraction torque are added (curve A, Fig. 6 and the scale of Fig. 9) the full scale current and watt input are .056 and .925, respectively, and the full scale milliwatt input per unit of torque is 157.

For the complete instrument with the fixed irons for both attraction and repulsion torques (curve $I+R+A$, Fig. 6 and the scale of Fig. 10), the full scale current and watt input are .055 and .89, respectively, and the full scale milliwatt input per unit of torque is 151. This illustrates the enormous increase in sensitivity and efficiency obtained by the invention. These values are for an experimental instrument employing one elliptical vane and a 120 degree scale. If the same instrument were used with a 90 degree scale, the full scale torque relation under the different conditions for the same ampere turns would be different, as shown by the following table:

|  | 90° scale | | 120° scale | |
| --- | --- | --- | --- | --- |
|  | Torque | Relative torque | Torque | Relative torque |
| Inclination alone | 2.7 | 1.00 | 1.9 | 1.00 |
| Inclination and repulsion | 4 | 1.48 | 2.2 | 1.16 |
| Inclination and attraction | 5.2 | 1.93 | 5.6 | 2.95 |
| Inclination, repulsion and attraction | 6.4 | 2.37 | 5.9 | 3.11 |

Some further improvement in torque at the cost of a heavier moving element can be obtained by using additional iron vanes on the moving element.

In Figs. 11 and 12 I have represented a two-vane instrument to which the invention has been applied. Fig. 11 is intended to represent the instrument in the downscale position and Fig. 12 in the upscale position. The pointer scale and return spring are not shown. The vanes 21 and 22 are mounted on the shaft 12 at approximately the same inclination angle but do not lie in parallel planes and may also have their longitudinal axes at a slight angle to each other, measured in the plane of rotation. In the downscale position, fixed iron 23 produces repulsion on upper vane 21 and fixed iron 24 produces repulsion on the lower vane 22. The vanes and fixed irons are so disposed that these torques are in the same direction as the inclined coil torque i. e., clockwise as viewed from above.

In the upscale position the lower end of the upper vane 21 approaches the lower fixed iron 24 and the upper end of lower vane 22 approaches upper fixed iron 23 and the polarities are such that attraction occurs between the parts mentioned, which approach each other.

In the development of such an instrument it will be desirable to leave the fixed irons adjustable until the most favorable positions are found by trial and then the fixed irons may be secured in place in any suitable manner. In this form of instrument the inclined coil torque will be somewhat greater in comparison to the repulsion and attraction torques than with the instrument of Fig. 1 and the total torque will be somewhat greater.

In Figs. 13 and 14 I have represented another form of multiple vane instrument to which the invention has been applied. Two parallel inclined vanes 25 and 26 are used and are mounted on the shaft eccentrically, one being offset in one direction and the other in the opposite direction, such that the two vanes lie opposite each other in parallel planes. Their longitudinal axes are parallel. These vanes cooperate with fixed irons 27 and 28 to produce repulsion and attraction torques. In the downscale position, Fig. 1, there is repulsion between vane 25 and fixed iron 27 where they approach closest to each other. Likewise between vane 26 and fixed iron 28. In the upscale position (Fig. 14) both ends of both vanes lie adjacent fixed irons and the polarities are such as to produce attraction torques. The repulsion and attraction torques are in the same direction as the inclined coil torque.

Thus, with this instrument we have the inclined coil torque of both vanes over the entire scale range as usual. At the lower end of the scale we have two repulsion torque points and at the upper end of the scale we have four attraction torque points. This form will produce the greatest total torque at the upper end of the scale of any of the forms described, and is particularly efficient in this respect because of the almost continuous flux paths which are formed by the fixed irons and vanes in line with the flux axis of the coil.

Elliptical vanes have been described in the different modifications described but special requirements may make different forms desirable. Fig. 15 shows a plain bar vane, Fig. 16 shows a sector shaped vane and Fig. 17 shows an elliptical vane which has been partially split so as to be bent to the form shown. The fixed irons may likewise take a variety of forms and in Fig. 18 I have shown a fixed iron for producing both repulsion and attraction torque made from a plate curved to conform to the inner periphery of the coil and having an opening to decrease the flux carried by the plate in the central part. In general, it is desirable that the fixed irons be of such dimensions and so placed as not to rob the vane or vanes of the flux needed for inclined coil torque in the downscale positions and to increase the flux through the vanes in the upscale positions.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. An electrical measuring instrument of the inclined coil type comprising an energizing coil, a rotatable shaft, and magnetic vane means on the shaft, said parts being arranged to operate on the inclined coil torque principle, and a stationary magnetic member within said coil and polarized by the flux thereof and positioned adjacent to the path of movement of the magnetic vane member for producing a torque of attraction thereon in the same direction as and in addition to the inclined coil torque.

2. An electrical measuring instrument of the inclined coil type having an energizing coil, a shaft within said coil inclined with respect to the axis of the coil and magnetic vane means on and inclined to the shaft, and stationary magnetic means within and polarized by the flux of said coil extending adjacent to the path of movement of the magnetic vane means to produce torques of magnetic repulsion and magnetic attraction thereon in the same direction as the inclined coil torque of said instrument.

3. An electrical measuring instrument of the inclined coil type having an energizing coil, a shaft inclined with respect to the axis of the coil and a pair of magnetic vanes spaced apart on the shaft within the coil and inclined to the shaft, and stationary magnetic means within and polarized by said coil to produce magnetic poles adjacent to the paths of travel of said vanes causing a torque of repulsion thereon over the lower range of travel of the vanes and a torque of attraction thereon over the upper range of travel of said vanes, both of said torques being in the same direction as the inclined coil torque of said instruments.

4. An electrical measuring instrument of the inclined coil type comprising a stationary coil, a rotatable shaft inclined to the axis of the coil and a magnetic vane on the shaft within the coil inclined with respect to the shaft, a pair of stationary magnetic members within the coil and polarized by the flux thereof and positioned at different points adjacent the path of movement of the vane, one of said members producing a torque of magnetic repulsion on the vane and the other of said members producing a torque of magnetic attraction on the vane, both of said torques being in the same direction as the inclined coil torque of the instrument.

5. An electrical measuring instrument of the inclined coil type comprising a stationary coil, a rotatable shaft inclined to the axis of the coil and a plurality of magnetic vanes on and inclined with respect to the shaft, a stationary magnetic part within and polarized by the flux of the coil and positioned adjacent to the path of travel of different vanes, said polarized magnetic part producing a torque of repulsion on one vane over one portion of the deflection range of the instrument and a torque of attraction on another vane over a different range of deflection of the instrument, both of said torques being in the same direction as and in addition to the inclined coil torque of said instrument.

6. An electrical measuring instrument of the inclined coil type comprising a stationary field coil, a rotatable shaft inclined to the axis of the coil, a pair of elliptical magnetic vanes on said shaft and inclined with respect thereto, the plane and longitudinal axes of said vanes being parallel, and said vanes being mounted on the shaft such that one is offset in one direction and the other in the opposite direction in the direction of their longitudinal axes so as to lie substantially opposite each other, a pair of stationary magnetic core members within and polarized by said coil having pole pieces adjacent the path of movement of the vanes, said members individually producing repulsion torques on the magnetic vanes over the down scale range of movement thereof and collectively producing torques of attraction on the magnetic vanes over the up scale range of movement thereof, all of said torques being in the same direction as the inclined coil torque of said instrument.

STEPHEN C. HOARE.